United States Patent
Hiramoto (10) Patent No.: US 11,593,274 B2
(45) Date of Patent: Feb. 28, 2023

(54) CACHING OF ADDRESS TRANSLATION TABLE IN LAST STAGE OF MULTI-STAGE PAGE TABLE WALK

(71) Applicant: FUJITSU LIMITED, Kawasaki (JP)

(72) Inventor: Shinya Hiramoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/228,910

(22) Filed: Apr. 13, 2021

(65) Prior Publication Data
US 2021/0390061 A1 Dec. 16, 2021

(30) Foreign Application Priority Data
Jun. 15, 2020 (JP) .............................. JP2020-103134

(51) Int. Cl.
*G06F 12/1009* (2016.01)
*G06F 12/0875* (2016.01)

(52) U.S. Cl.
CPC ...... *G06F 12/1009* (2013.01); *G06F 12/0875* (2013.01); *G06F 2212/1024* (2013.01)

(58) Field of Classification Search
CPC ............. G06F 12/1009; G06F 12/0875; G06F 2212/1024
See application file for complete search history.

(56) References Cited

U.S. PATENT DOCUMENTS

| | | | |
|---|---|---|---|
| 2006/0075146 A1* | 4/2006 | Schoinas | G06F 12/1009 710/22 |
| 2007/0204129 A1 | 8/2007 | Nishino et al. | |
| 2018/0330085 A1* | 11/2018 | Lukacs | G06F 21/51 |
| 2019/0377686 A1 | 12/2019 | Shirahige | |
| 2021/0149818 A1* | 5/2021 | Venkataraman | G06F 12/1036 |

FOREIGN PATENT DOCUMENTS

| | | |
|---|---|---|
| JP | 2007-233615 A | 9/2007 |
| JP | 2019-212167 A | 12/2019 |

OTHER PUBLICATIONS

Arithmetic. Article [online]. Dictionary.com, Jul. 15, 2019 [retrieved on Apr. 20, 2022], Retrieved from the Internet: <URL: https://web.archive.org/web/20190715045148/https://www.dictionary.com/browse/arithmetic>. (Year: 2019).*

* cited by examiner

Primary Examiner — Chie Yew
(74) *Attorney, Agent, or Firm* — WHDA, LLP (57) ABSTRACT

A semiconductor device includes an address translation device configured to identify a plurality of address translation tables which is used for address translation having a plurality of stages; and an adder configured to identify a stage in the address translation when executing the address translation, wherein the address translation device configured to perform cache control for information of a first address translation table used in a last stage of the address translation when the stage is the final stage.

4 Claims, 6 Drawing Sheets

CACHING OF ADDRESS TRANSLATION TABLE IN LAST STAGE OF MULTI-STAGE PAGE TABLE WALK

CROSS-REFERENCE TO RELATED APPLICATION

This application is based upon and claims the benefit of priority of the prior Japanese Patent Application No. 2020-103134, filed on Jun. 15, 2020, the entire contents of which are incorporated herein by reference.

FIELD

The embodiment discussed herein is related to a semiconductor device and an arithmetic processing device.

BACKGROUND

There are some cases where address translation is performed in a plurality of stages in translating a virtual address into a physical address.

Figure 1:
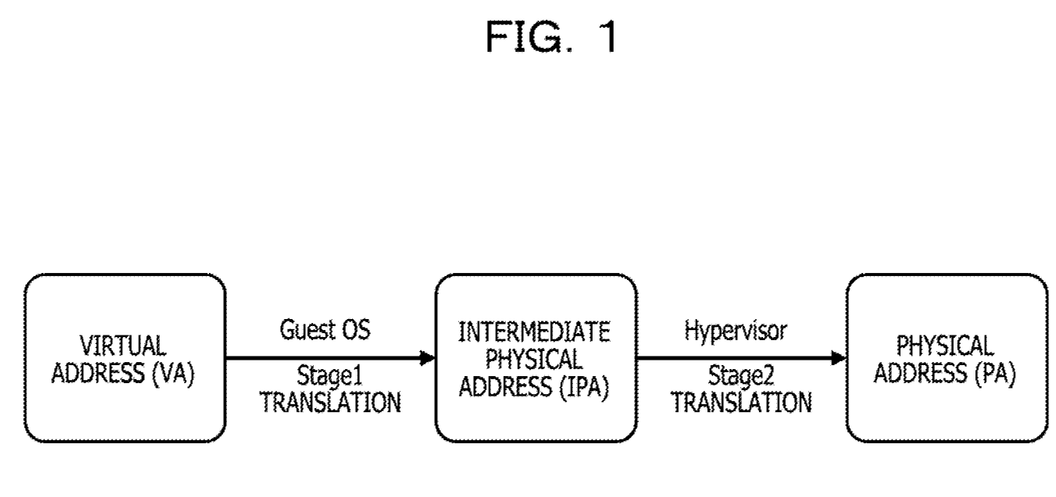
FIG. 1 is a diagram illustrating address translation in multiple stages.

FIG. 1 is a diagram illustrating address translation in multiple stages.

In the example illustrated in FIG. 1, to run Guest OS on Hypervisor, the Guest OS translates a virtual address (VA) into an intermediate physical address (IPA) in Stage1, and the Hypervisor translates the intermediate physical address into a physical address (PA) in Stage2.

In each stage of translation, an address translation table may be configured at a plurality of levels.

Figure 2:
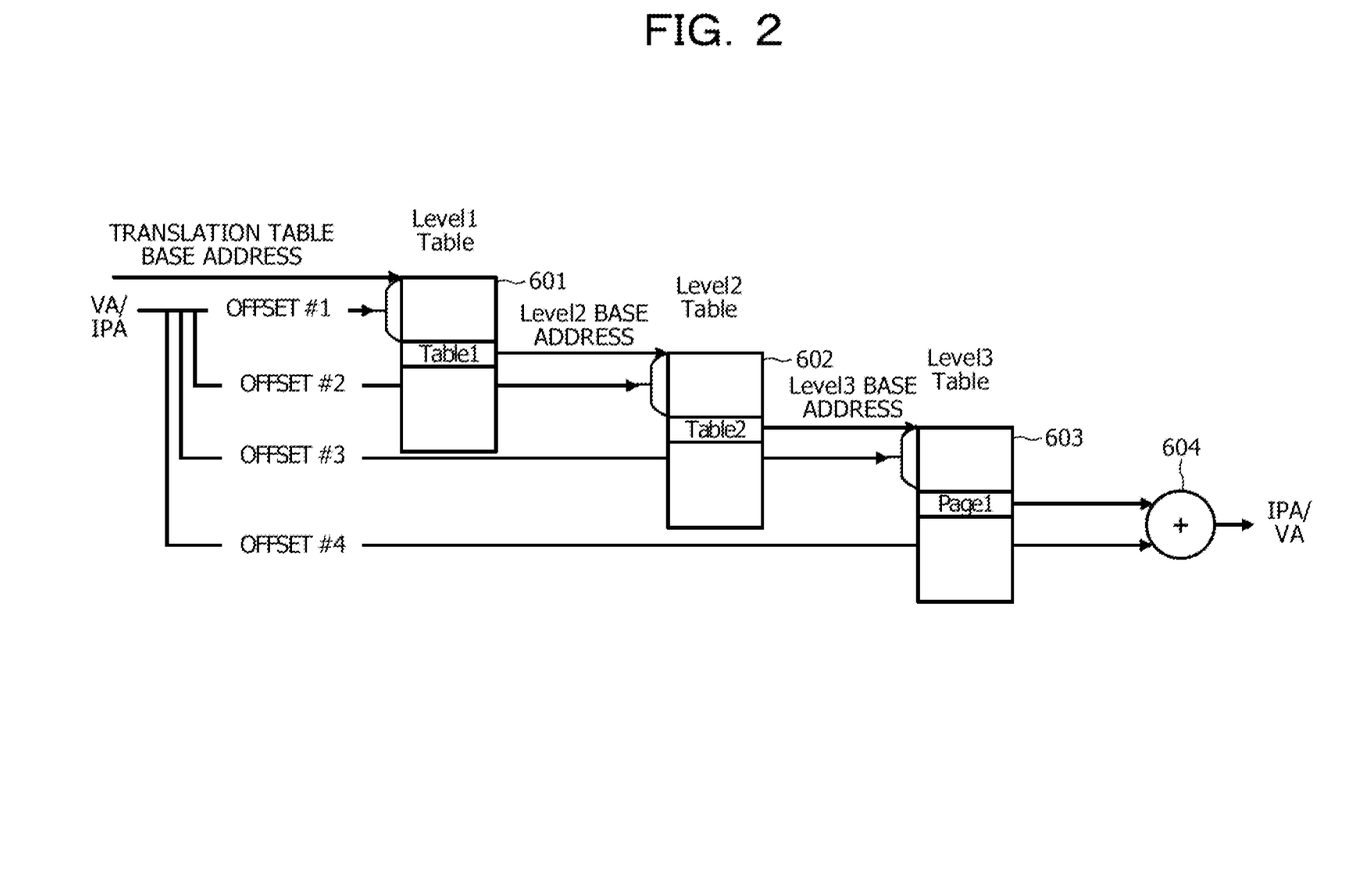
FIG. 2 is a diagram illustrating a plurality of levels of address translation tables.

FIG. 2 is a diagram illustrating a plurality of levels of address translation tables.

FIG. 2 illustrates a configuration example of three levels of translation tables. Table entry 601 (Table1) at Level1 and Table entry 602 (Table2) at Level2 store base addresses of the next Level translation tables. A value obtained by adding an offset of the virtual address or the intermediate physical address to be translated to the base address by an adder 604 is an address of the entry used in the translation at each level. Furthermore, the intermediate physical address or the physical address of the translation result is a value obtained by adding an address and an offset stored in Page1 entry 603 at Level3 by the adder 604.

An address translation device acquires Table/Page entries 601 to 603 at the respective levels from a main storage device and performs translation. The address translation device calculates the address of the entry 601 at the first level from the VA and IPA to be translated and the base address, and obtains the entry from the main storage device. When the acquired entry is Table, the address translation device calculates the next-level address and acquires the entry from the main storage device. Furthermore, when the acquired entry is Page, the address translation device returns the translated address. Distinction between Table and Page may be made by flags stored in the entries.

The address translation device caches Table and Page internally in order to perform translation processing at high speed. In particular, in a plurality of levels of address translation, Tables (Table1 and Table2) are cached. For example, even if Page1 is not cached in a translation look-aside buffer (TLB), Page1 is acquired by one main memory fetch based on Table2 if Table2 is cached. Japanese Laid-open Patent Publication No. 2019-212167, Japanese Laid-open Patent Publication No. 2007-233615, and the like are disclosed as related art.

SUMMARY

According to an aspect of the embodiments, a semiconductor device includes an address translation device configured to identify a plurality of address translation tables which is used for address translation having a plurality of stages; and an adder configured to identify a stage in the address translation when executing the address translation, wherein the address translation device configured to perform cache control for information of a first address translation table used in a last stage of the address translation when the stage is the final stage.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

However, in address translation in a plurality of stages, the number of address translations is biased in each stage and thus the cache may also be biased. The cause of the bias in the example illustrated in FIG. 2 is that the Stage2 translation is performed in the acquisition of Table and Page of Stage1 itself. For example, in the example illustrated in FIG. 2, in the case of Stage1, it is the Guest OS that sets the base address of the translation table and the next-Level address stored in the Table or Page entry at each Level, and the address to be set is the intermediate address. Therefore, to actually obtain these entries from the main storage device, the Stage2 translation from the intermediate physical address into the physical address is performed.

Figure 3:
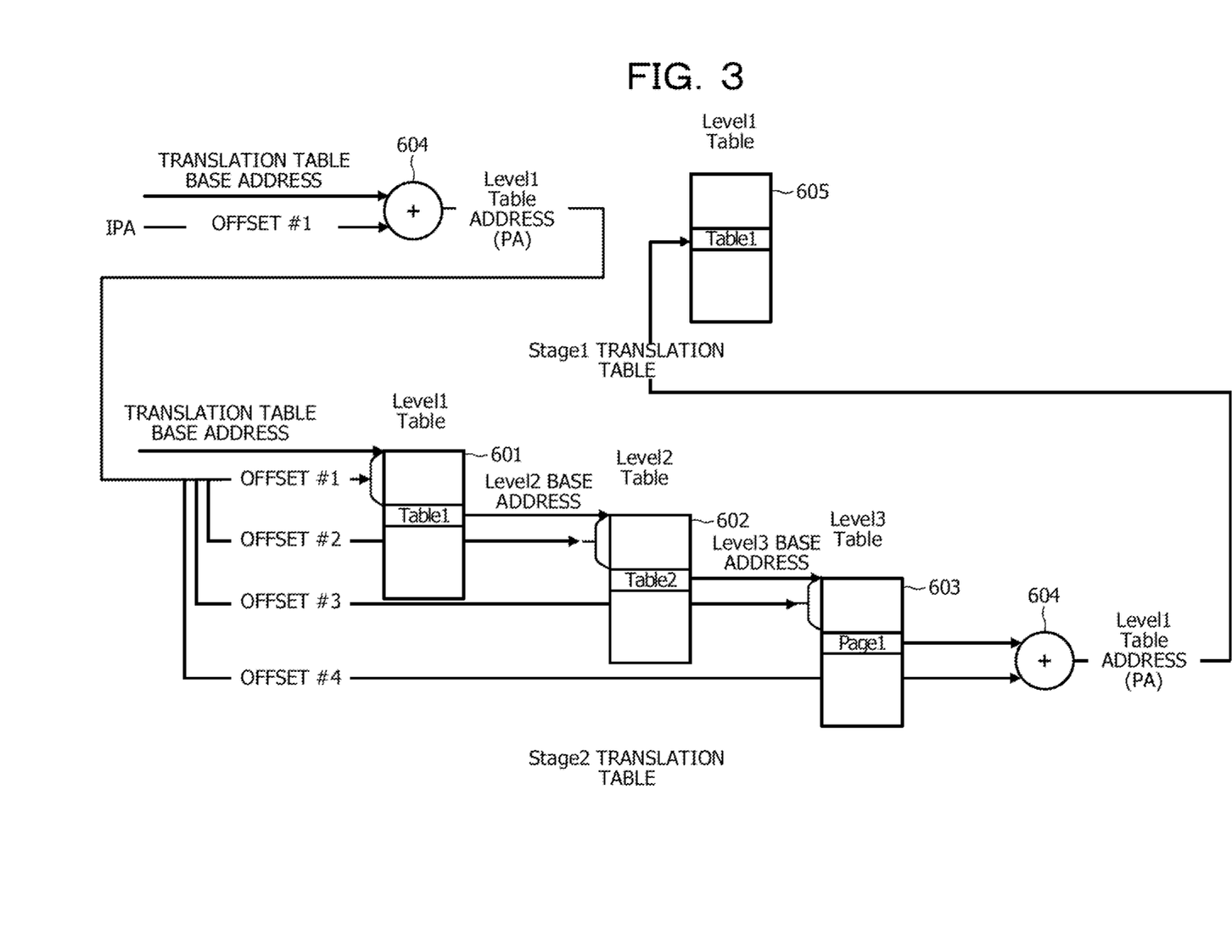
FIG. 3 is a diagram illustrating Stage2 translation of a Stage1 Level1 table.

FIG. 3 is a diagram illustrating the Stage2 translation of a Stage1 Level1 table.

To acquire each Level of Stage1 from the main storage device, the Stage2 translation is executed. When caching Tables and Pages used in respective Stages and Levels, entries 601 to 603 are prepared for the number of translation levels (three in the example illustrated in FIG. 3) in Stage2 whereas one entry 605 is prepared in Stage1. As a result, the cache configuration may be biased and the cache utilization efficiency may decrease. For example, in a case where Stage1 and Stage2 share the same cache random access memory (RAM), it is assumed that the RAM will be filled with the cache of Stage2 and cache miss in Stage1 will frequently occur.

Such a bias in the cache configuration occurs more prominently when each stage is configured by a plurality of levels of address translation tables, but the bias can also occur in a one-level configuration.

In view of the above, it is desirable to reduce a decrease in the cache utilization efficiency when performing address translation using a plurality of address translation tables.

A Embodiment

Hereinafter, an embodiment will be described with reference to the drawings. Note that the embodiment to be described below is merely an example, and there is no intention to exclude application of various modifications and techniques not explicitly described in the embodiment. That is, the present embodiment can be modified in various ways and implemented without departing from the spirit of the embodiment. Furthermore, each drawing is not intended to include only components illustrated in the drawing and may include other functions and the like.

Hereinafter, the same respective reference numeral represents similar parts in the drawings, and thus description thereof will be omitted.

Figure 4:
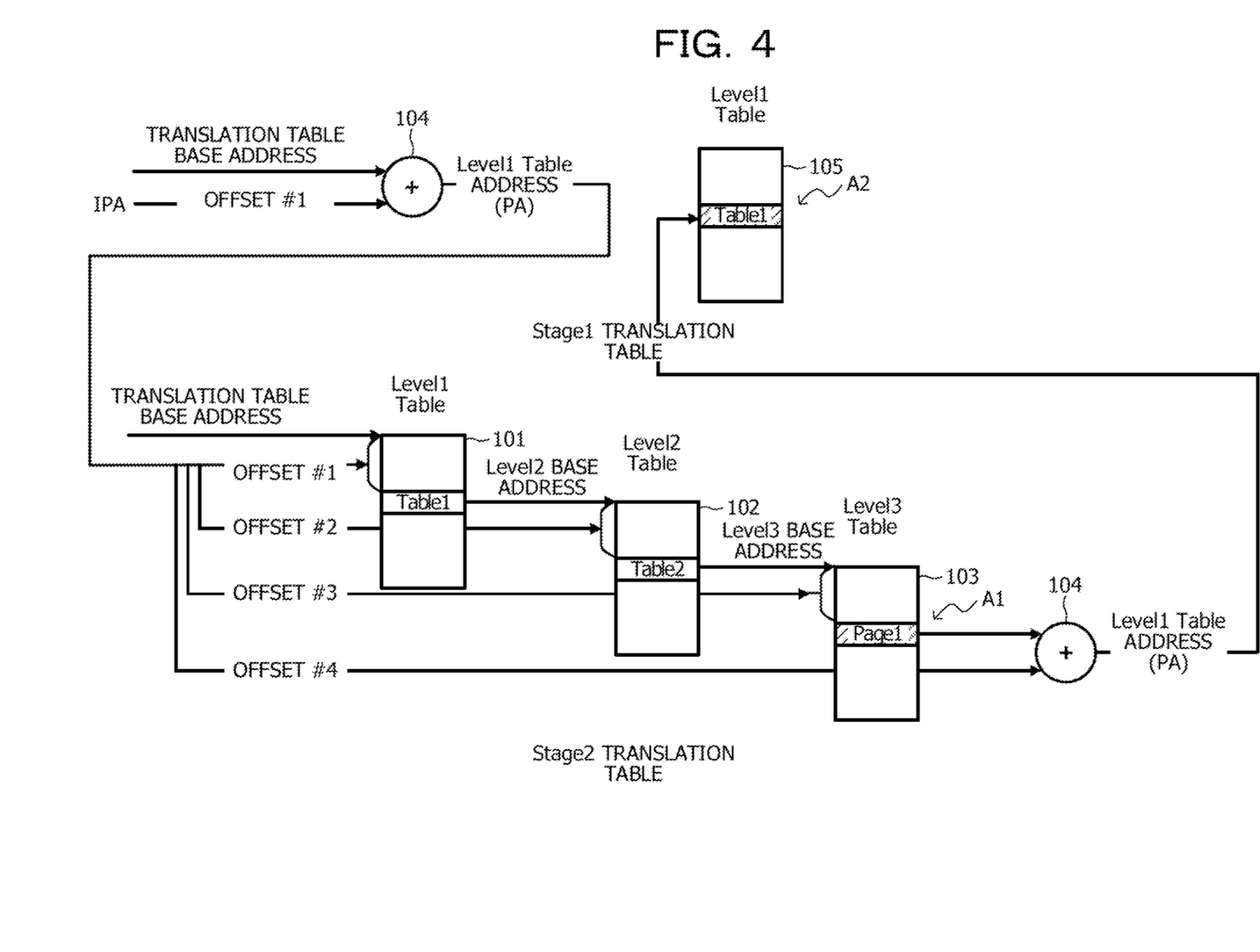
FIG. 4 is a diagram for describing address translation processing in an example of an embodiment.

FIG. 4 is a diagram for describing address translation processing in an example of an embodiment.

In the address translation processing illustrated in FIG. 4, a base address of a translation table and an offset #1 of IPA are added by an adder 104, and a Level1 Table address as PA is output.

In the Stage2 translation, an offset of PA and the base address of the translation table are input to entries 101 to 103 of respective Level Tables. The base address of the translation table and the offset #1 of PA are input to a Table entry 101 (Table1) of Level1, and a base address of Level2 is output. The base address of Level2 and the offset #2 of PA are input to a Table entry 102 (Table2) of Level2, and a base address of Level3 is output. The base address of Level3 and the offset #3 of PA are input to a Table entry 103 (Page1) of Level3, and a translation result of Stage2 is output.

The output of the Table entry 103 of Level3 and the offset #4 of PA are added by the adder 104, and the Level1 Table address as PA is output.

In Stage1 translation, the Level1 Table address as PA is input to a Table entry 105 (Table1) of Level1.

In the Stage2 translation illustrated in FIG. 4, the Table1 and Table2 are not cached but only the Page1 is cached, as illustrated by reference numeral A1. Furthermore, since the data size in the Stage1 translation is small, the Table1 is cached, as illustrated by reference numeral A2. Then, in the address translation of a Table entry 105 near the Stage1 Table1 on IPA, hitting Stage2 Page1 can be expected.

In a case where the address type to be translated in Stage2 is setting information, the method of limiting the entry to be cached is not limited to the above example. For example, in a case where the address type is data, nearby Tables and Pages on the address may be pre-cached together, but in the case where the address type is the setting information, pre-cache may not be performed.

Figure 5:
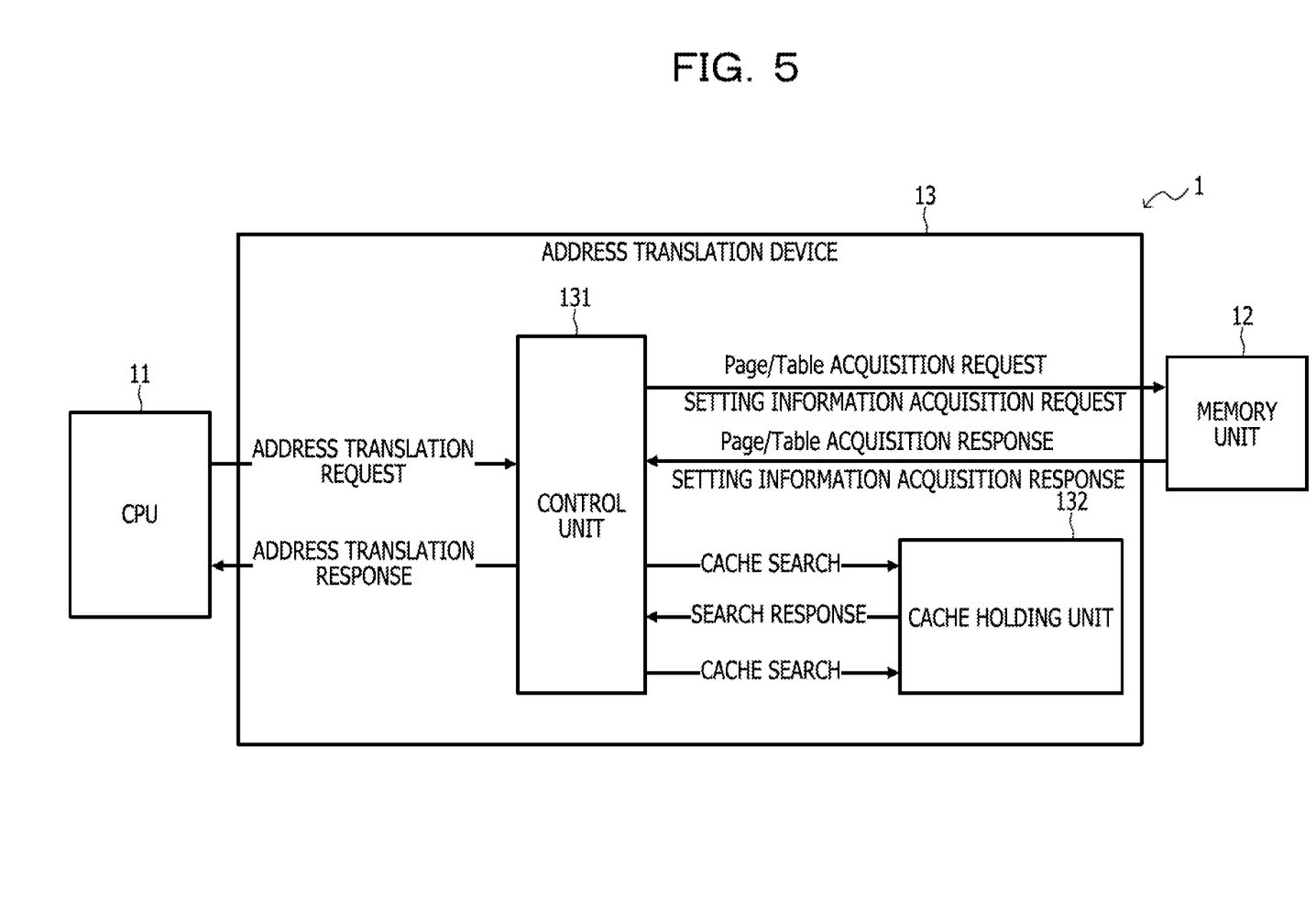
FIG. 5 is a block diagram schematically illustrating a configuration example of an address translation system in an example of an embodiment.

FIG. 5 is a block diagram schematically illustrating a configuration example of an address translation system 1 according to an example of the embodiment.

The address translation system 1 includes a central processing unit (CPU) 11, a memory unit 12, and an address translation device 13.

The CPU 11 is a processing device that performs various types of control and calculation, and implements various functions by executing an operating system (OS) and programs stored in the memory unit 12. The CPU 11 may be referred to as a CPU Core/input output (IO) device.

The device for controlling operation of the entire address translation system 1 is not limited to the CPU 11, and may be any one of MPU, DSP, ASIC, PLD, and FPGA, for example. Furthermore, the device for controlling the operation of the entire address translation system 1 may be a combination of two or more of the CPU, MPU, DSP, ASIC, PLD, and FPGA. Note that the MPU is an abbreviation for a micro processing unit, the DSP is an abbreviation for a digital signal processor, and the ASIC is an abbreviation for an application specific integrated circuit. Furthermore, the PLD is an abbreviation for a programmable logic device, and the FPGA is an abbreviation for a field programmable gate array.

The memory unit 12 is an example of the main storage device, which is, for example, a read only memory (ROM), a random access memory (RAM), or the like. The RAM may be, for example, a dynamic RAM (DRAM). Programs such as a basic input/output system (BIOS) may be written in the ROM of the memory unit 12. A software program of the memory unit 12 may be appropriately read and executed by the CPU 11. Furthermore, the RAM of the memory unit 12 may be used as a temporary recording memory or a working memory.

The address translation device 13 is an example of a semiconductor device, and functions as a control unit 131 and a cache holding unit 132.

The control unit 131 receives an address translation request from the CPU 11 and returns an address translation response to the CPU 11.

The control unit 131 issues a Page/Table acquisition request and a setting information acquisition request to the memory unit 12, and receives a Page/Table acquisition response and a setting information response from the memory unit 12.

The cache holding unit 132 returns a search response to the control unit 131 in response to a cache search from the control unit 131. Furthermore, the cache holding unit 132 accepts cache registration from the control unit 131. The control unit 131 selects whether to register a cache in the cache holding unit 132 according to the type of the address to be translated.

In a procedure specified in ARM architecture, Stage2 Table/Page acquisition is performed in addition to the Page/Table of Stage1 and Stage2 translation of the address requested for translation. For example, when performing address translation, the setting information is acquired, and when acquiring a part of the setting information (for example, context descriptor), Stage2 address translation is performed. Furthermore, Stage2 address translation is also performed for Stage1 Table/Page acquisition, as described with reference to FIG. 4. Therefore, the control unit 131 also calculates the address of the Stage2 Table/Page for acquiring the setting information and performs a cache search.

The control unit 131 performs cache control for information of the address translation tables (in other words, the entries 103 and 105 in FIG. 4) used in the last stage of the address translation stage, and does not perform cache control for information of the other address translation tables (in other words, the entries 101 and 102 in FIG. 4).

The information of the other address translation tables may be information in which the target to be acquired from the memory unit 12 is a table, and the use is acquisition of setting information. The information of the address translation table used in the last stage may be information in which the target to be acquired from the memory unit 12 is a page and the use is acquisition of the setting information. Furthermore, the information of the address translation table used in the last stage may be information in which the target to be acquired from the memory unit 12 is a table and the use may not be acquisition of the setting information.

Note that the case where the use is acquisition of setting information is the Stage2 Table for performing address translation for context descriptor or the Stage2 Table for performing address translation for the Stage1 Table/Page, for example. Furthermore, whether the target for the cache search is Table or Page may be distinguished on the basis of the flag of the acquired entry.

A-2 Operation

Figure 6:
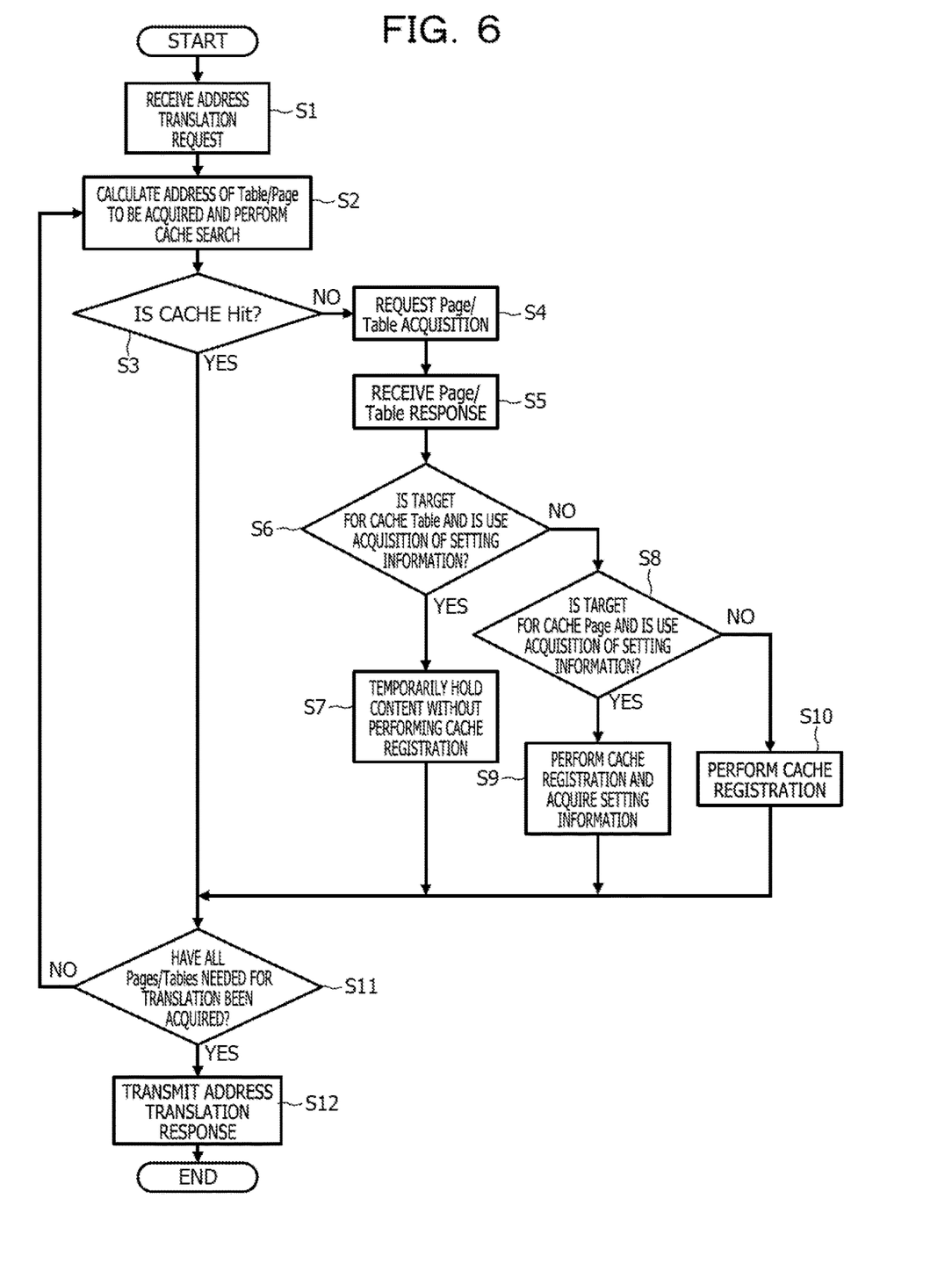
FIG. 6 is a flowchart of the address translation processing in the example of the embodiment.

The address translation processing in the example of the embodiment will be described with reference to the flowchart (steps S1 to S12) illustrated in FIG. 6.

The control unit 131 receives the address translation request from the CPU 11 (step S1).

The control unit 131 calculates the addresses of Stage1 and Stage2 Table/Page to be acquired on the basis of the procedure specified in the ARM architecture, for example, and performs a cache search (step S2).

The control unit 131 determines whether the Table/Page of which the address has been calculated has hit the cache (step S3).

In the case where Table/Page has hit the cache (see the YES route in step S3), the processing proceeds to step S11.

On the other hand, in the case where Table/Page has not hit the cache (see the NO route in step S3), the control unit 131 makes a Page/Table acquisition request to the memory unit 12 (step S4).

The control unit 131 receives a Page/Table response from the memory unit 12 (step S5).

The control unit 131 determines whether the target for the cache search is a Table and the use is acquisition of setting information (step S6).

In the case where the target for the cache search is a Table and the use is acquisition of setting information (see the YES route in step S6), the control unit 131 does not perform cache registration and temporarily holds the content of the Page/Table response (step S7). Then, the processing proceeds to step S11.

On the other hand, in the case where the target for the cache search is not a Table, or the use is not the acquisition of setting information (see the NO route in step S6), the control unit 131 determines whether the target for the cache search is a Page, and the use is the acquisition of setting information (step S8).

In the case where the target for the cache search is a Page and the use is the acquisition of setting information (see the YES route in step S8), the control unit 131 performs the cache registration of the content of the Page/Table response in the cache holding unit 132 and acquires the setting information from the memory unit 12 on the basis of an address translation result (step S9). Then, the processing proceeds to step S11.

In the case where the target for the cache search is not a Page and the use is not the acquisition of setting information (see the NO route in step S8), the control unit 131 performs cache registration of the content of the Page/Table response in the cache holding unit 132 (step S10). Then, the processing proceeds to step S11.

The control unit 131 determines whether all the Pages/Tables needed for translation have been acquired (step S11).

In the case where there is Page/Table that has not been acquired among the Pages/Tables needed for translation (see the NO route in step S11), the processing returns to step S2.

On the other hand, in the case where all the Pages/Tables needed for translation have been acquired (see the YES route in step S11), the control unit 131 transmits the address translation response to the CPU 11 (step S12). Then, the address translation processing ends.

A-3 Effect

The address translation device 13 in the above-described example of the embodiment can exhibit the following effects, for example.

The control unit 131 performs the cache control for the information of the address translation tables used in the last stage of the address translation stage, and does not perform the cache control for the information of the other address translation tables.

Therefore, a decrease in the cache utilization efficiency can be reduced when performing address translation using a plurality of address translation tables. Specifically, a bias of a cache ratio between stages can be reduced. For example, it is assumed that the cache control is performed for the information of all the address translation tables in a case where three levels of Stage2 translation is performed for Stage1 Page/Table address translation, as illustrated in FIG. 4. In this case, three Stage2 Page/Tables are cached every time one Stage1 Page/Table is acquired. Meanwhile, it is enough to cache only one Stage2 Page when the cache control is performed only for the information of the address translation table in the last stage, as in the above-described example of the embodiment. Since the data size of the Stage1 Page/Table is small, the Stage1 Page/Table with a similar address hits the Stage2 Page. Since it is expected that Stage2 Table is not used even if it is cached, it is possible to improve the cache utilization efficiency by caching only the Stage2 Page and not caching the unnecessary Stage2 Table.

The information of the other address translation tables is the information in which the target to be acquired from the memory unit 12 is a table, and the use is the acquisition of setting information. Thereby, the cache control for such information of address translation tables can be suppressed.

The information of the address translation table used in the last stage is the information in which the target to be acquired from the memory unit 12 is a page and the use is the acquisition of the setting information. Furthermore, the information of the address translation table used in the last stage is the information in which the target to be acquired from the memory unit 12 is a table and the use is not the acquisition of setting information. Thereby, the cache control for such information of address translation tables can be appropriately performed.

B Others

The disclosed technique is not limited to the embodiment described above, and various modifications may be made without departing from the spirit of the present embodiment. Each of the configurations and processes according to the present embodiment may be selected as needed, or may be combined as appropriate.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A semiconductor device comprising:
   an address translation device configured to identify a plurality of address translation tables which are used in address translation having a plurality of stages, including an initial stage where a virtual address is translated into an intermediate physical address (IPA) and a last stage where the IPA is translated into a physical address; and
   an adder configured to identify a stage in the address translation when executing the address translation, wherein
   the address translation device is configured to perform cache control only of information of a last address translation table, among a plurality of address translation tables at different levels, used in the last stage of the address translation when the stage is the last stage,
   the address translation device is configured not to perform cache control of information of all other address translation tables at a plurality of levels different from a level of the last address translation table when the stage is the last stage, and
   the information of the other address translation tables is information in which a target to be acquired from a main storage device is a table.

2. The semiconductor device according to claim 1, wherein the information of the last address translation table used in the last stage is information in which a target to be acquired from a main storage device is a page.

3. The semiconductor device according to claim 1, wherein the information of the last address translation table used in the last stage is information in which a target to be acquired from a main storage device is a table.

4. An arithmetic processing device, comprising:
   a memory; and
   a processor coupled to the memory, the processor being configured to:
      store a plurality of address translation tables in the memory, the plurality of address translation tables being to be used in address translation having a plurality of stages, including an initial stage where a virtual address is translated into an intermediate physical address (IPA) and a last stage where the IPA is translated into a physical address;
      identify a stage in the address translation when executing the address translation; and
      perform cache control processing only of information of a last address translation table, among a plurality of address translation tables at different levels, used in the last stage of the address translation and not perform cache control of information of all other address translation tables at a plurality of levels different from a level of the last address translation table when the stage is the last stage, the information of the other address translation tables being information in which a target to be acquired from a main storage device is a table.

* * * * *